(12) United States Patent
Campbell et al.

(10) Patent No.: US 9,459,069 B1
(45) Date of Patent: Oct. 4, 2016

(54) LUBRICATION ARROW REST

(71) Applicants: Robert D Campbell, Flagstaff, AZ (US); Michael L Campbell, Flagstaff, AZ (US)

(72) Inventors: Robert D Campbell, Flagstaff, AZ (US); Michael L Campbell, Flagstaff, AZ (US)

(73) Assignee: Slick Hunting Products Inc, Flagstaff, AZ (US)

( * ) Notice: Subject to any disclaimer, the term of this patent is extended or adjusted under 35 U.S.C. 154(b) by 203 days.

(21) Appl. No.: 14/158,923

(22) Filed: Jan. 20, 2014

(51) Int. Cl.
*F41B 5/14* (2006.01)
*F16N 7/00* (2006.01)

(52) U.S. Cl.
CPC ............... *F41B 5/143* (2013.01); *F16N 7/00* (2013.01)

(58) Field of Classification Search
CPC .......... F14B 5/143; F41B 5/143; F42B 6/02; F42B 6/04; F16N 7/00
See application file for complete search history.

(56) References Cited

U.S. PATENT DOCUMENTS

| | | | |
|---|---|---|---|
| 1,173,194 A * | 2/1916 | Kohl et al. | A46B 11/0013 15/229.2 |
| 2,998,811 A | 9/1961 | Sackmann | |
| 3,318,298 A | 5/1967 | Bear | |
| 3,494,347 A | 2/1970 | Saunders | |
| 3,823,797 A * | 7/1974 | Ducatillon | D07B 7/12 118/266 |
| 3,989,388 A * | 11/1976 | Sparr, Sr. | A46B 9/02 15/160 |
| 5,020,637 A * | 6/1991 | Hoenselaar | B65D 83/303 184/15.1 |
| 5,213,180 A * | 5/1993 | Masonek | B62J 31/00 184/15.1 |
| 5,245,980 A | 9/1993 | Colvin | |
| 5,353,778 A | 10/1994 | Blankenship | |
| 5,373,831 A | 12/1994 | Cushman | |
| 5,385,135 A | 1/1995 | Sunders | |
| 5,460,151 A | 10/1995 | Hamilton, Jr. et al. | |
| 5,460,152 A | 10/1995 | Specht | |
| 5,529,049 A | 6/1996 | Antalosky | |
| 5,564,527 A * | 10/1996 | Coffey | F41B 5/14 184/102 |
| 5,676,121 A | 10/1997 | Bizier | |
| 6,155,244 A | 12/2000 | McClanahan | |
| 6,257,369 B1 * | 7/2001 | Pesl | B62J 31/00 184/15.1 |
| 6,725,851 B1 * | 4/2004 | Graf | F41B 5/143 124/44.5 |
| 6,742,510 B2 | 6/2004 | Troncoso, Jr. | |
| 6,994,080 B1 * | 2/2006 | Yoder | F41B 5/143 124/44.5 |
| 7,615,249 B1 * | 11/2009 | Kudwa | F42B 6/04 427/201 |

* cited by examiner

*Primary Examiner* — Minh Truong
(74) *Attorney, Agent, or Firm* — Invention To Patent Services; Alex Hobson

(57) ABSTRACT

A lubricating arrow rest is configured to lubricate an arrow shaft when the arrow is inserted into the arrow rest and then shot. A lubricating arrow rest has a plurality of whiskers configured within a whisker retainer and a lubricant receiving feature configured to accept a lubricant into the lubricating arrow rest. A lubricant reservoir may be attached to a lubricant receiver feature and may have a lubricant dispensing feature to force lubricant from the lubricant reservoir onto the whiskers through a supply orifice. A whisker retainer may comprise a retainer conduit that disperses the lubricant through a plurality of outlet orifices configured around the inner perimeter of the whisker retainer. A lubricating arrow rest may have a bow fixture for attachment to a bow. A lubricant reservoir may be coupled to the bow fixture and a bow fixture conduit may couple the lubricant reservoir with a supply orifice.

14 Claims, 11 Drawing Sheets

LUBRICATION ARROW REST

BACKGROUND OF THE INVENTION

1. Field of the Invention

The present invention relates to an arrow rest comprising a lubricant receiver and lubricant dispenser configured to dispend lubricant to a plurality of whiskers.

2. Background

Archers and particularly bow hunters take steps to ensure that their arrows are configured properly for the type of bow and energy imparted to the arrow when shot. The type and weight of the arrowhead are variables a bow hunter considers before going out on a hunt. A bow hunter wants their arrow to have effective penetration into the game, and the speed and energy of the arrow plays an important role. An arrow may not effectively penetrate an animal in some cases and leave the animal wounded, sometimes critically. Animals will run off after being hit and may run for miles before collapsing, leaving the hunter with a difficult challenge to track and find the animal. It is desirable to have deeper penetration of an arrow into an animal, thereby increasing the likelihood of dropping the animal in close proximity to where it was struck by the arrow.

In addition, many archers practice their skills by shooting at targets. Arrow can be very difficult to remove from targets and may cause injury to the archer when trying to remove the arrow and/or damage the arrow.

SUMMARY OF THE INVENTION

The invention is directed to a lubricating arrow rest that is configured to lubricate an arrow shaft when the arrow is inserted into the rest and then shot from a bow. An exemplary arrow rest comprises a plurality of whiskers configured within a whisker retainer. An exemplary whisker retainer, of the present invention, comprises a retainer conduit configured to hold lubricant. The lubricant is configured to be delivered from the retainer conduit to the whiskers, whereby the whiskers may wick the lubricant from an attached end, along the whiskers to the extended end. An arrow inserted into the arrow rest contacts the lubricated whiskers and lubricant is transferred to the arrow shaft. The lubricated arrow shaft may have greater penetration into an object, such as a game animal, and/or may be easier to remove from a target. The present invention provides an effective means for coating an arrow shaft with lubricant without the need to manually handle the lubricant or arrow shaft during lubrication. An arrow shaft may be automatically lubricated by placing the arrow into the arrow rest, as described herein, and pulling the arrow back.

A whisker retainer may comprise a lubricant receiving feature, whereby a lubricant may be provided to the whisker retainer and/or into a retainer conduit through a supply orifice. A lubricant receiving feature may comprise a reservoir adapter configured to detachably attach a lubricant reservoir. For example, a reservoir adapter may comprise a threaded member that is configured to couple with an opposing threaded member of a lubricant reservoir. A threaded member may comprises a male threaded portion and a lubricant reservoir may comprise a female threaded portion configured to thread onto the male threaded portion. Any suitable type of reservoir adapter may be used however.

A retainer conduit may extend substantially along the outer perimeter of the whisker retainer and be coupled with one or more outlet orifices. An outlet orifice is configured to dispense lubricant from the retainer conduit to the whiskers. In an exemplary embodiment, a whisker retainer is a circular shape having an outer perimeter and an inner perimeter, whereby the retainer conduit is configured there between. One or more outlet orifices may be configured along the inner perimeter where the attached ends of the whiskers may receive lubricant. In another embodiment, a lubricating arrow rest is configured to dispense lubricant from a lubricant reservoir directly to the whiskers. The outlet of a lubricant reservoir may attach to the whisker retainer and dispense lubricant to a more local region of the whiskers and the whiskers may wick the lubricant uniformly about the whiskers.

A lubricant dispensing device, such as a plunger, or bulb, for example, may be used to force lubricant from a retainer conduit onto the whiskers. In some embodiments, a lubncating arrow rest comprises a lubricant reservoir that is coupled to a whisker retainer. A lubricant dispensing device may be configured on the lubricant reservoir that is made out of a pliable material and configured to dispense lubricant when the lubricant reservoir is deformed. For example, a lubricant reservoir may be made out of a plastic container that can be squeezed to dispense the lubricant, contained therein, into a retainer conduit or directly onto the whiskers. In another embodiment, a retainer conduit may be filled with lubricant through a reservoir adapter, and then a detachable lubricant dispensing device may be couple to the reservoir adapter to dispense lubricant from the retainer conduit to the whiskers as required. In still another embodiment, a lubricant dispensing device is attached to the whisker reservoir, separate from the reservoir adapter, and can be used to dispense lubricant to the whiskers as required, with or without a lubricant reservoir attached. In yet another embodiment, a lubricating arrow rest comprises a lubricant reservoir adapter and a separate lubricant dispensing device.

A lubricating arrow rest, as described herein, comprises a plurality of whiskers having extended ends configured to support an arrow shaft there between. Each of the plurality of whiskers has an attached end and an extended end. In an exemplary embodiment, a whisker retainer is circular in shape and the extended ends of the whiskers terminate in a center region configured to hold an arrow shaft. The whiskers may extend in a generally radial direction within the circular whisker retainer. In some embodiments, there is an opening configured in the center region and in other embodiments, the extended ends are configured to leave substantially no opening in the center region. Extended ends on one side of the whisker retainer may overlap with the extended ends from an opposing side of a whisker retainer, for example. Whiskers may be made out of any suitable material, including plastic, hair, fabrics, organic materials, metal, composites and the like.

In an exemplary embodiment, a whisker retainer comprises an arrow insert opening, or an opening in the perimeter of the whisker retainer, to allow an arrow shaft to be inserted into the lubricating arrow rest. For example, a whisker retainer may have a substantially circular shape or outer perimeter and a portion of the outer perimeter may be configured as an arrow insert opening. Any suitable portion of the outer perimeter of a whisker retainer may be configured as an arrow insert opening including, but not limited to, about 10 degrees or more, 30 degrees or more, 45 degrees or more, 60 degrees or more, 90 degrees or more and any range between and including the values provided. In other embodiments, a whisker retainer does not contain an arrow insert opening and the arrow head must be pushed through the whisker to properly configure the arrow in the lubricating arrow rest.

A whisker retainer may comprise an outlet orifice or an opening around the perimeter of the whisker retainer configured to deliver lubricant to the whiskers. A lubricating arrow rest, as described herein, may comprise any suitable number of outlet orifices including, but not limited to one or more, two or more, five or more, ten or more and any range between and including the numbers provided. A larger number of orifices may provide for more uniform distribution or quicker distribution of lubricant to the whiskers. In a preferred embodiment, a plurality of outlet orifices are configured on the inner perimeter of the whisker retainer where lubricant, being dispensed therefrom, directly contacts the whiskers. An outlet orifice may however be configured on the side of a whisker retainer. A lubricating arrow rest, as described herein, may comprise a whisker insert comprising a plurality of whiskers retained in a housing. A whisker insert may be inserted into a whisker retainer, as described herein. An outlet orifice may be configured to deliver lubricant to the whisker insert, such as directly to the whiskers.

A lubricating arrow rest, as described herein, may comprise a bow fixture that is configured to couple and attach the lubrication arrow rest to a bow. A bow fixture may comprise any suitable number of clamps or brackets and adjustment features configured to properly position the whisker retainer or arrow rest. A whisker retainer may be an integral part of a bow fixture. A lubricant reservoir may be coupled to a bow fixture and a bow fixture conduit coupled to the lubricant reservoir with a retainer conduit. Any suitable combination of lubricant reservoirs and/or lubricant dispensing features may be configured in a single lubricating arrow rest. A lubricant dispensing feature may be configured on a bow fixture, for example.

Any suitable type of lubricant may be utilized with the lubricating arrow rest, as described herein. In a preferred embodiment, a lubricant comprises a silicone oil. Other suitable lubricants include, natural or organic oils, including vegetable or olive oil, animal bases oils, hydrocarbon oils and greases, water or water based lubricants and the like. Water or water based lubricant may be used when an arrow comprises a water accepting outer surface or coating, such as a transition material. A transition lubricant may be a hydrogel type lubricant that is a network of polymer chains that are hydrophilic and can be dried, and in some cases either cross-linked or configured into an interpenetrating network, whereby the lubricant forms a coating on a surface. This dried hydrogel transition lubricant, may become very slippery when exposed to water or other liquid, such as animal fluids including blood. Hydrogels may comprise any suitable type of polymer including silicone, poly(vinly alcohol) PVA, polyurethanes, fluoropolymers, and the like. A lubricant coating on an arrow may have any suitable thickness and may be coated onto any portion of the arrow, including the arrow shaft, the arrowhead and the fletches. In an exemplary embodiment, substantially the entire outer portion of the arrow shaft length is coated with a transition lubricant, excluding the length where the fletches are configured.

A method of lubricating an arrow shaft is provided herein. This method includes the steps of providing a lubricating arrow rest as described herein; dispensing a lubricant to the plurality of whiskers; configuring an arrow shaft within the whisker retainer wherein the arrow is supported by the extended ends of the whiskers; wherein lubricant is transferred from the whiskers to the arrow shaft; moving said arrow through the whisker retainer to coat at least a portion of the outer surface of the arrow shaft with lubricant; and optionally shooting the arrow, whereby the arrow is a lubricated arrow.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
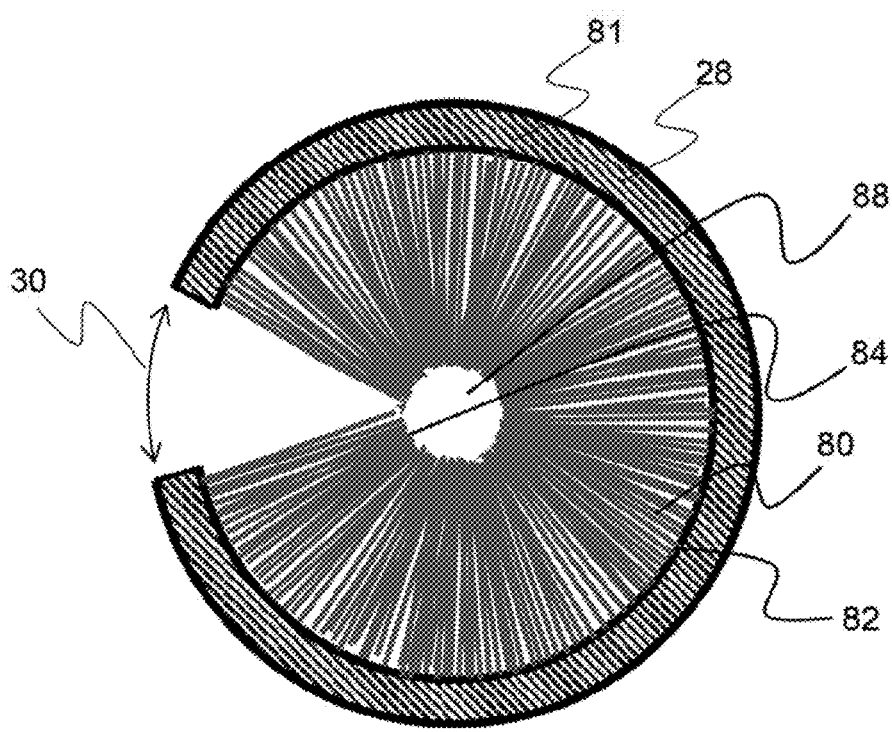

FIG. 1 shows a front view of an exemplary whisker insert comprising a plurality of whiskers and an arrow insert opening.

Figure 2:
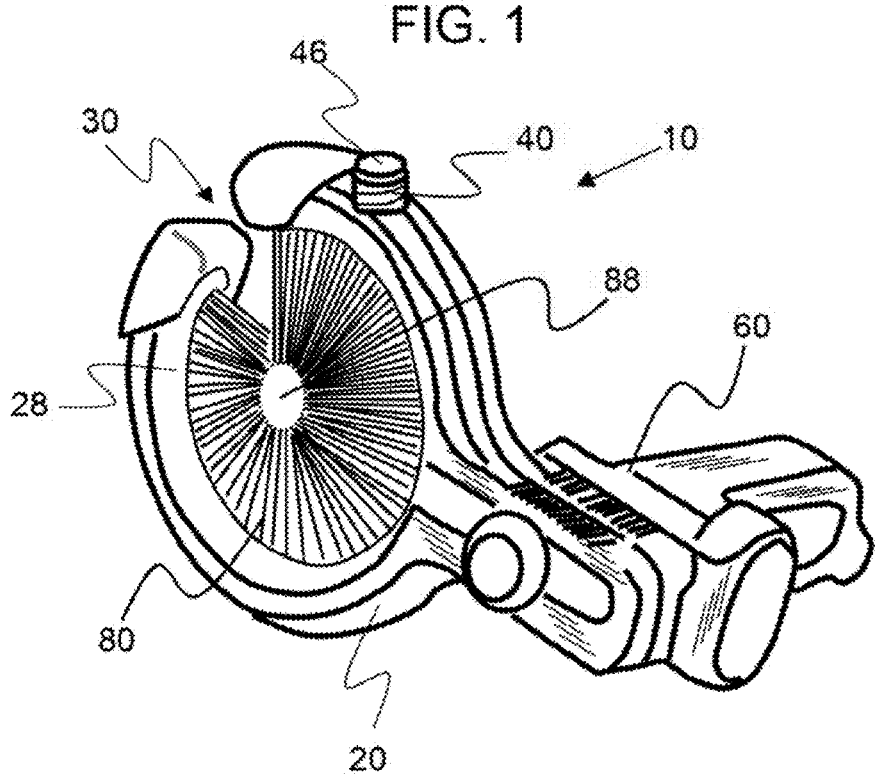

FIG. 2 shows a perspective view of an exemplary lubricating arrow rest comprising a whisker insert in a whisker retainer and a bow fixture.

Figure 3:
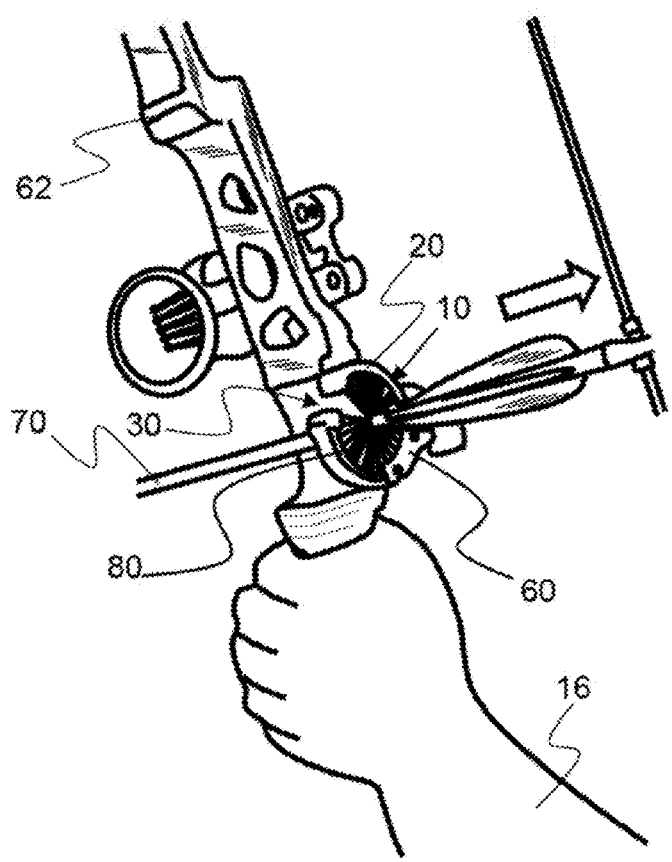

FIG. 3 shows a perspective view of an exemplary lubricating arrow rest attached to a bow.

Figure 4:
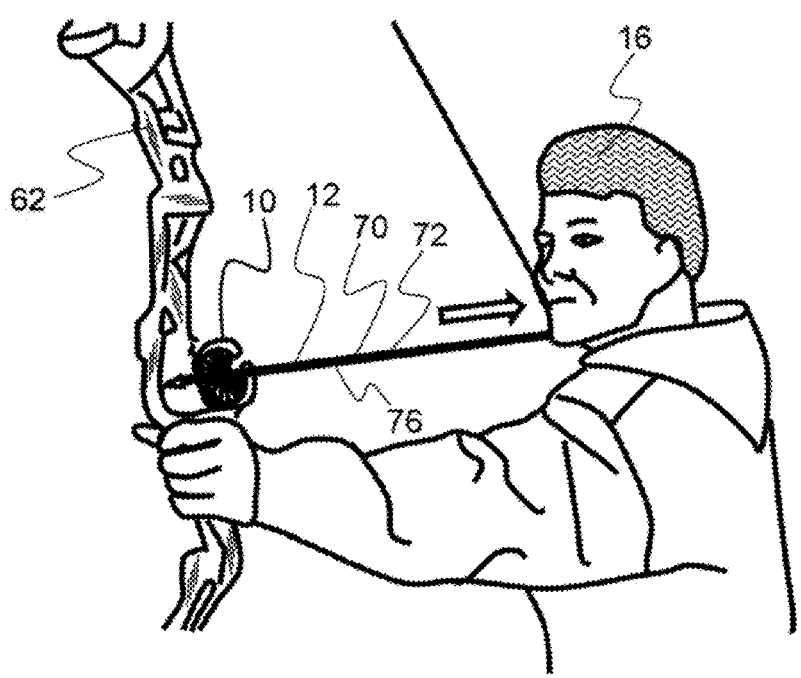

FIG. 4 shows a perspective view of an exemplary lubricating arrow rest attached to a bow.

Figure 5:
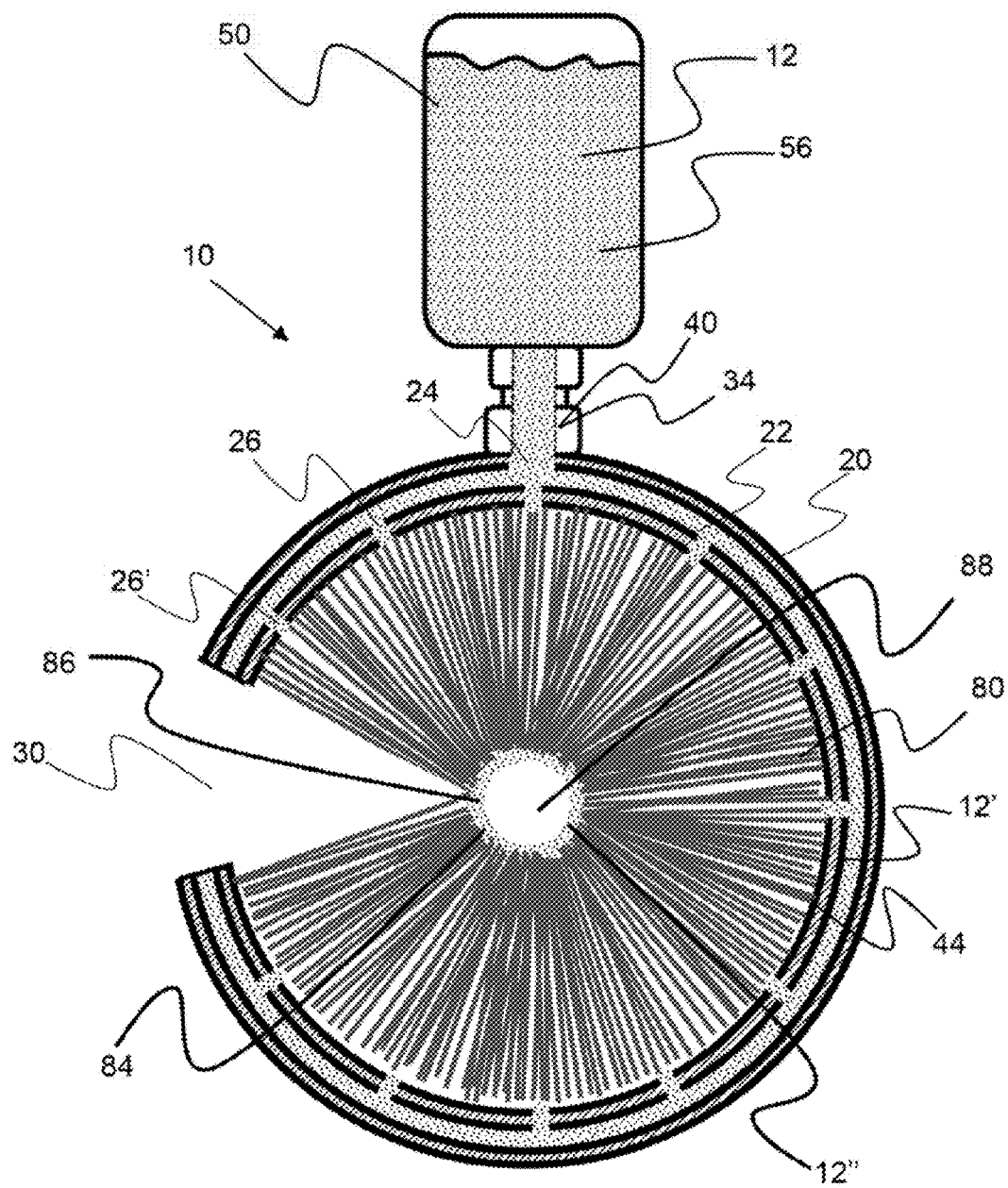

FIG. 5 shows a cross-sectional front view of an exemplary whisker retainer having a lubricant reservoir attached to a lubricant receiving feature.

Figure 6:
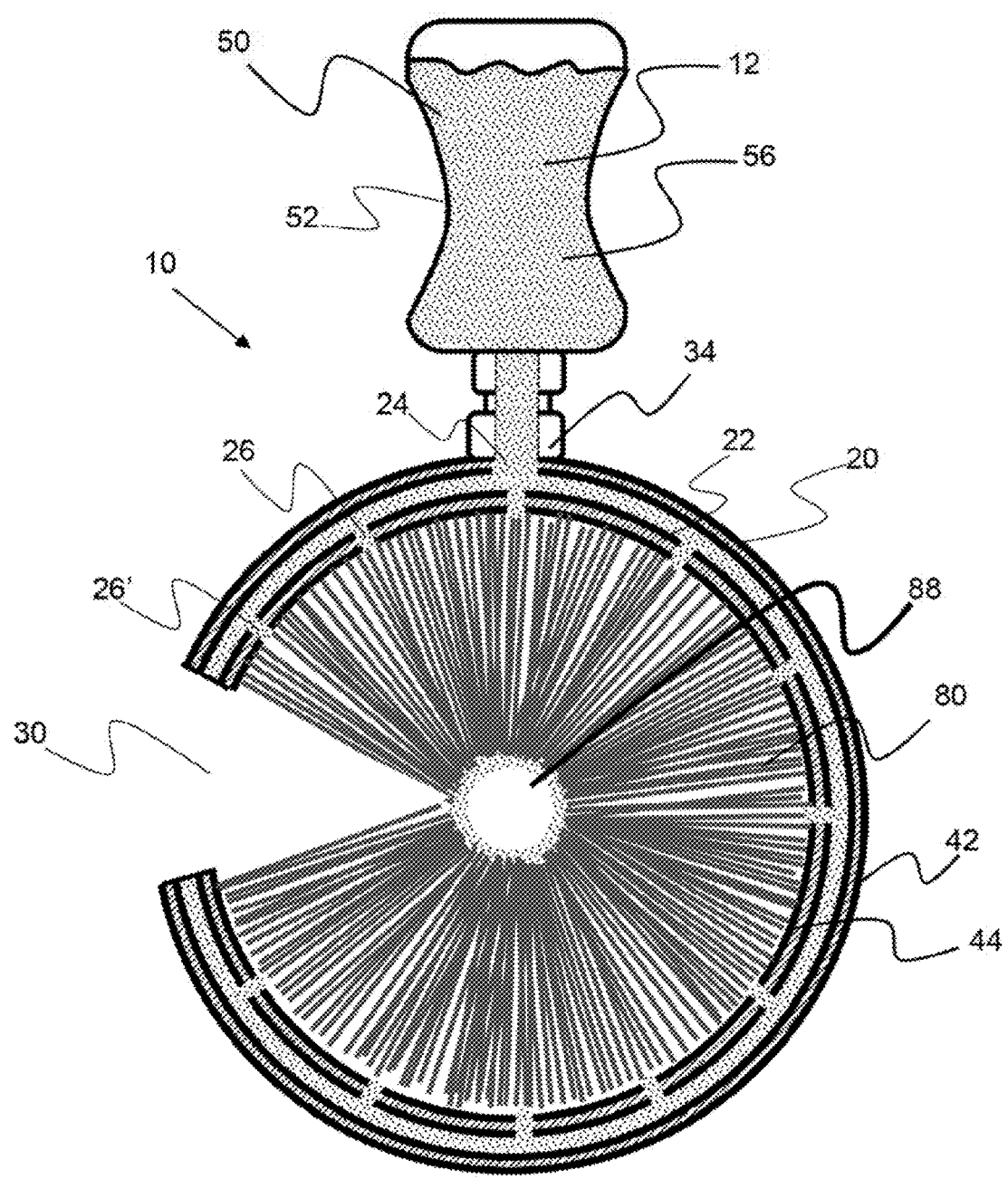

FIG. 6 shows a cross-sectional front view of the exemplary whisker retainer shown in FIG. 5 with the lubricant reservoir deformed to dispense lubricant into the retainer conduit.

Figure 7:
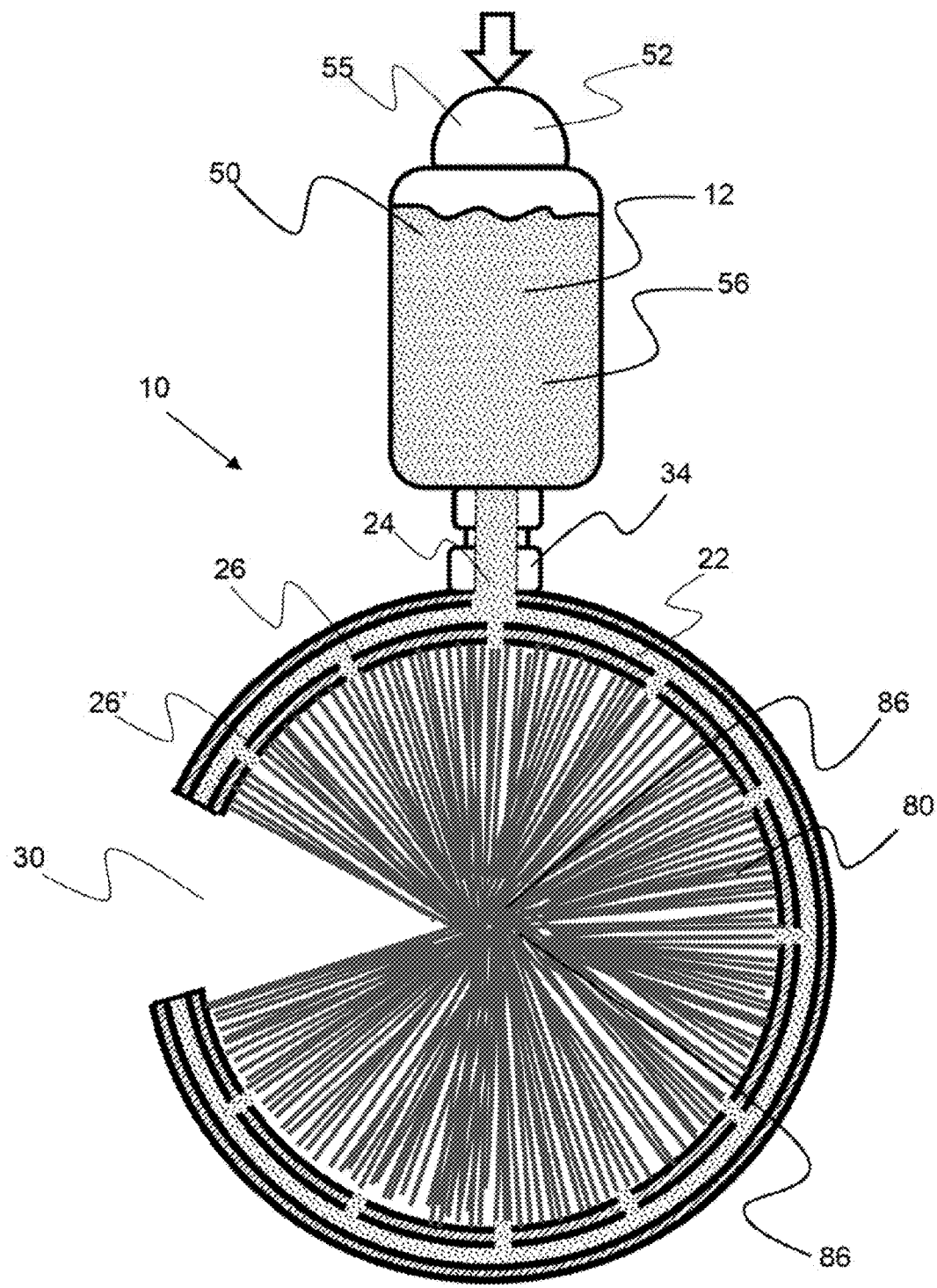

FIG. 7 shows a cross-sectional front view of an exemplary whisker retainer having a lubricant reservoir attached to a reservoir adapter.

Figure 8:
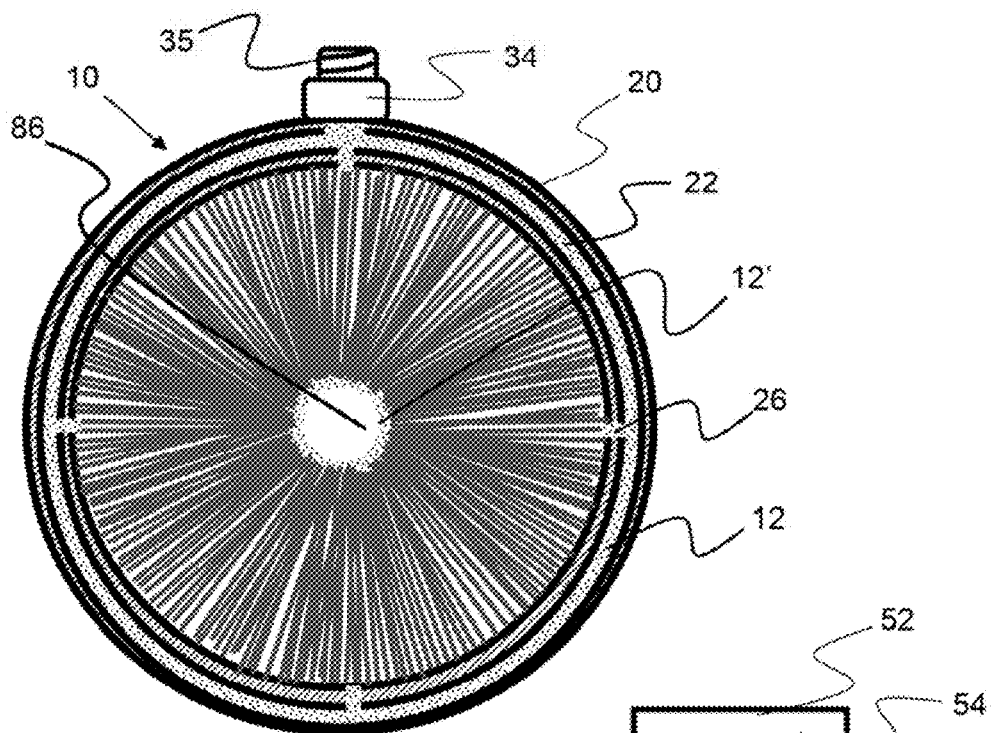

FIG. 8 shows a cross-sectional front view of an exemplary whisker retainer having a reservoir adapter comprising a male threaded member.

Figure 9:
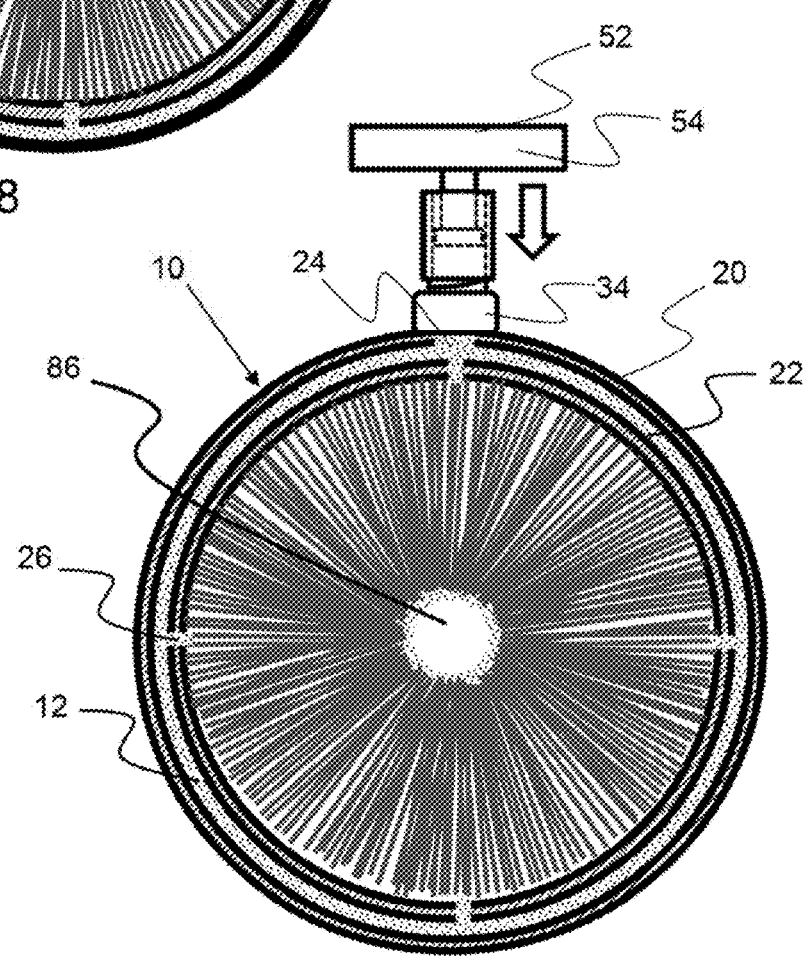

FIG. 9 shows a cross-sectional front view of an exemplary whisker retainer having a plunger lubricant dispensing feature.

Figure 10:
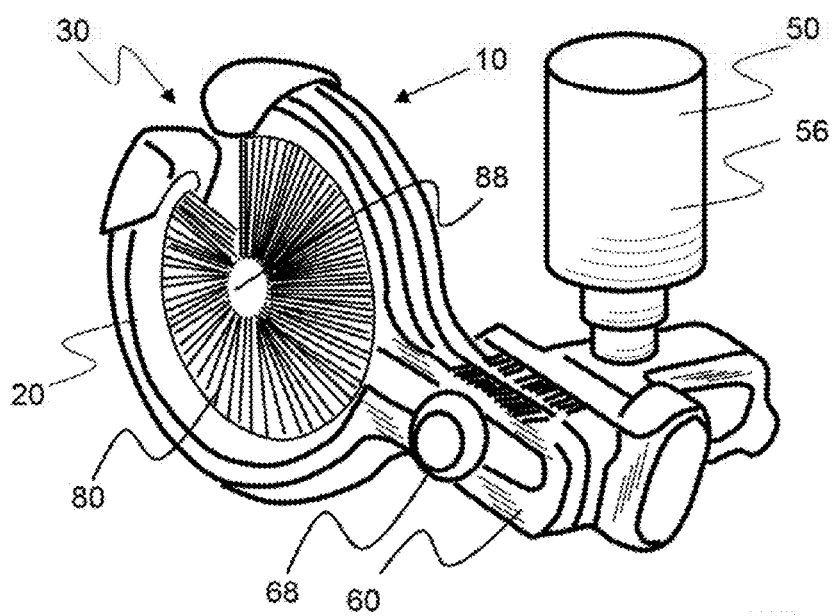

FIG. 10 shows a perspective view of an exemplary lubricating arrow rest having a lubricant reservoir coupled to a bow fixture.

Figure 11:
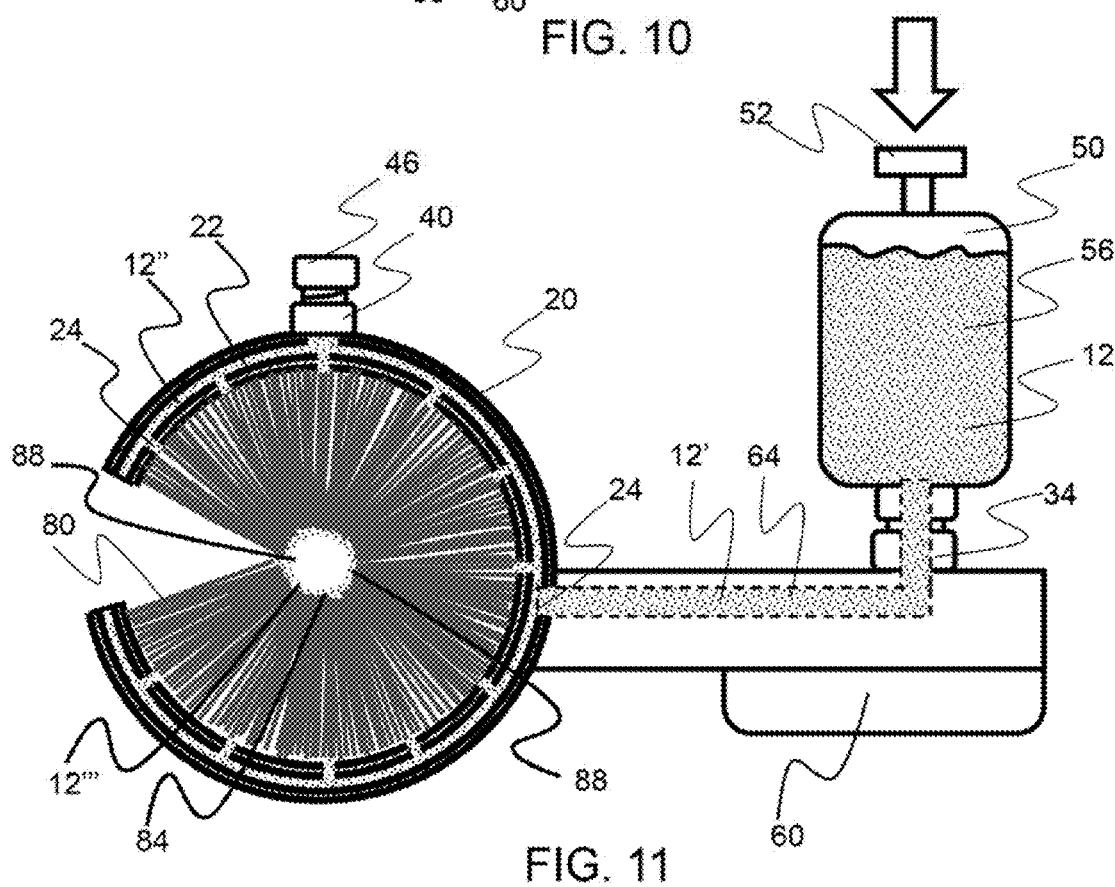

FIG. 11 shows a cross-sectional view of an exemplary lubricating arrow rest having a lubricant reservoir coupled to a bow fixture.

Figure 12:
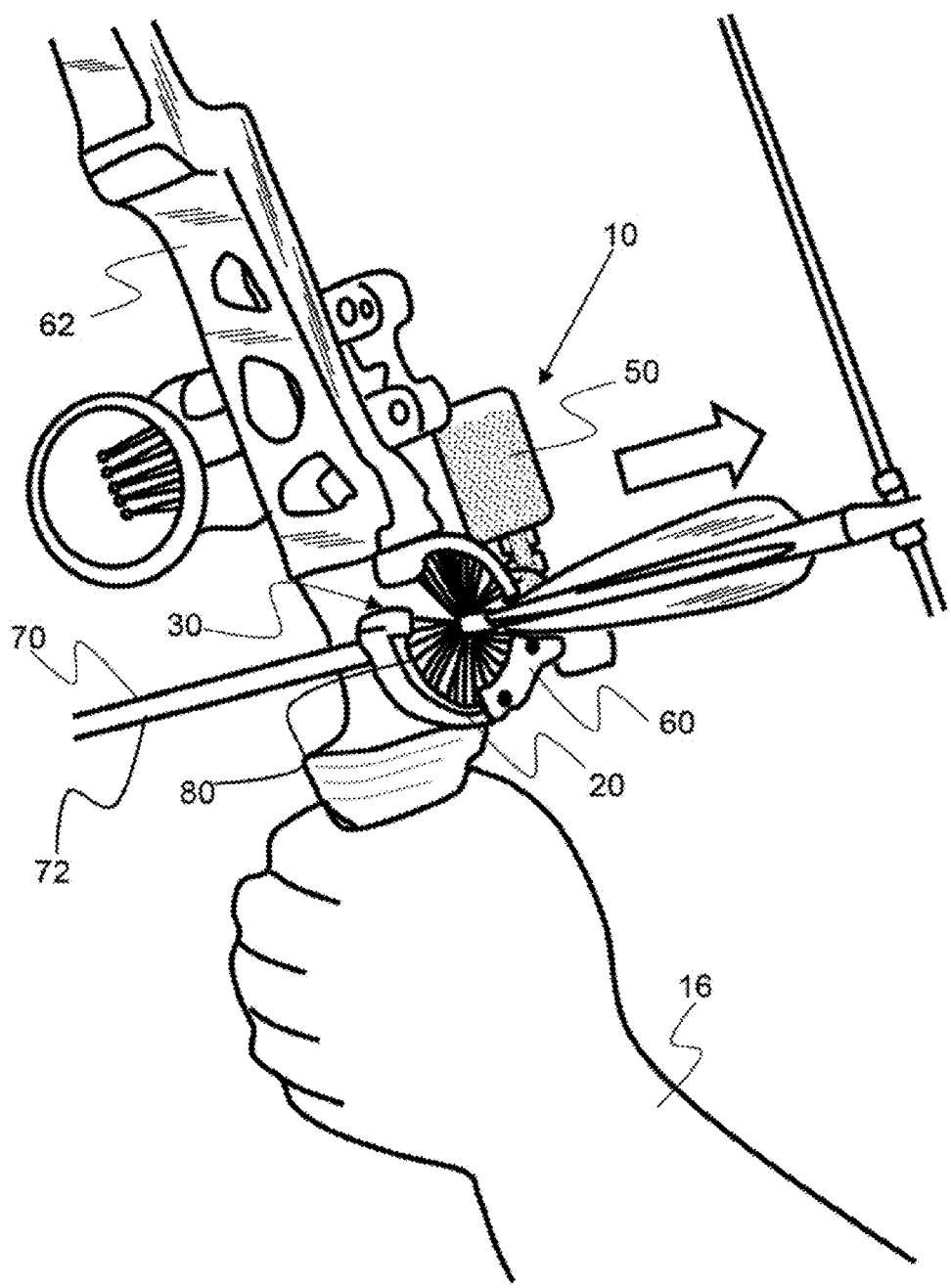

FIG. 12 shows a perspective view of an exemplary lubricating arrow rest attached to a bow and having a lubricant reservoir coupled to a bow fixture.

Figure 13:
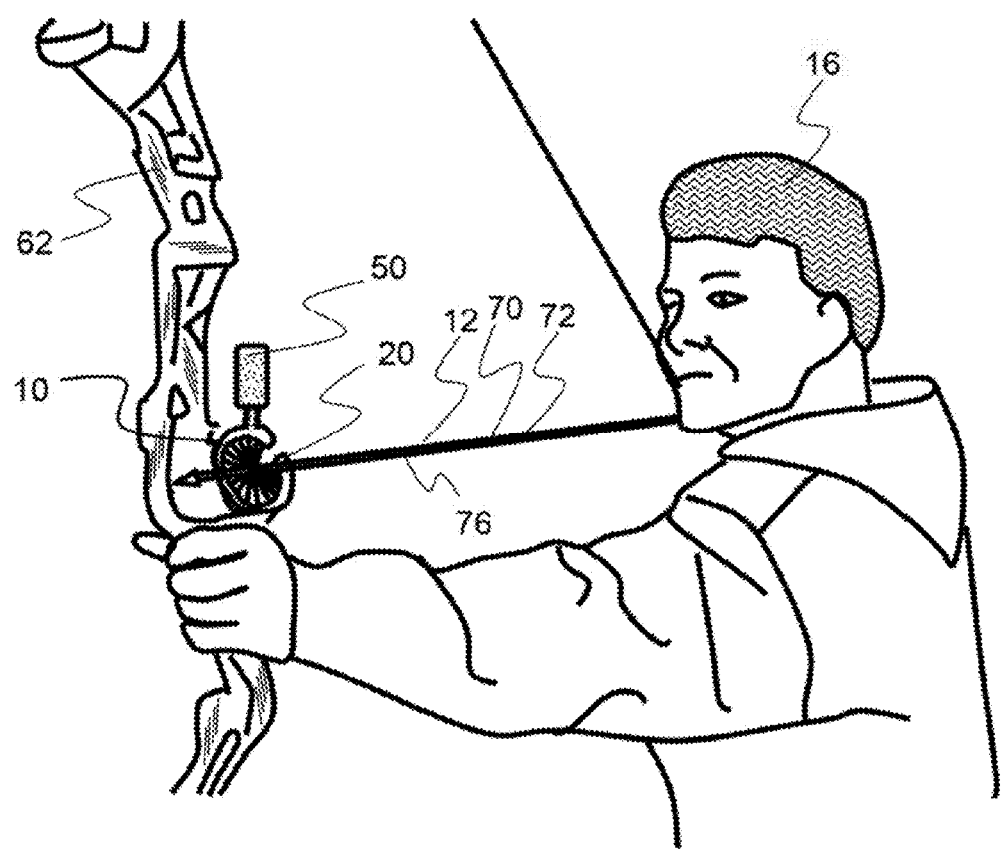

FIG. 13 shows a perspective view of an exemplary lubricating arrow rest attached to a bow and having a lubricant reservoir coupled to a whisker retainer.

Figure 14:
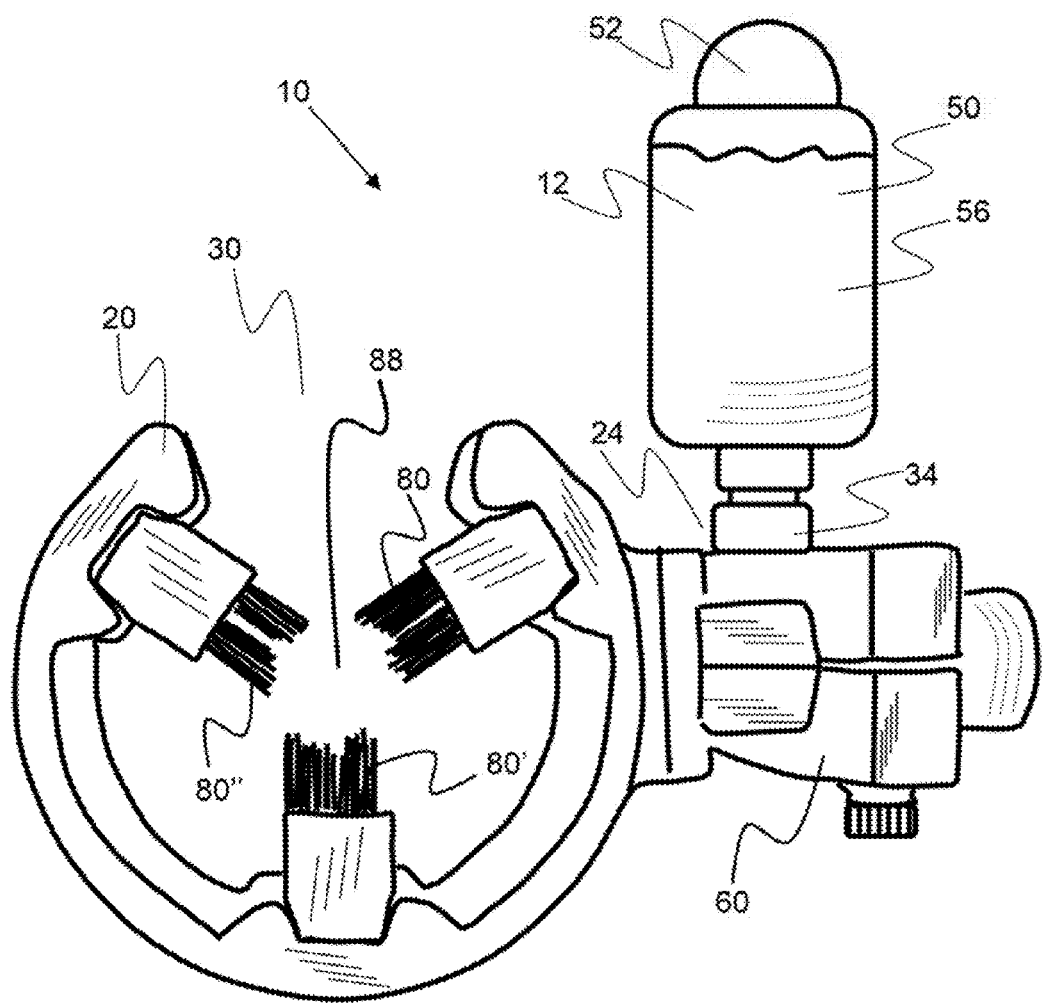

FIG. 14 shows a front view of an exemplary lubricating arrow rest having a lubricant reservoir coupled to a bow fixture.

Figure 15:
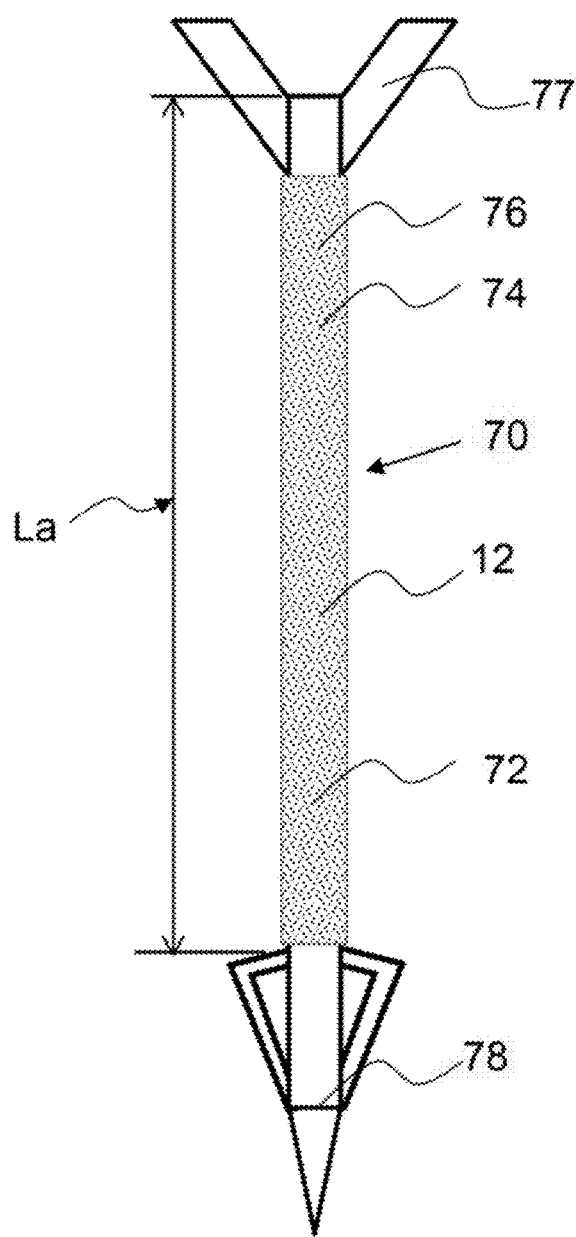

FIG. 15 shows a side view of an exemplary lubricated arrow.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the termnns "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an exemplary whisker insert 28 comprises a plurality of whiskers 80 and an arrow insert opening 30. In some embodiments, a whisker insert 28, as shown in FIG. 1 for example, may be attached to a whisker retainer. A whisker insert comprises a plurality of whiskers having attached ends 82 and extended ends 84. As shown in FIG. 1, a center opening 88 is formed at the extended ends of the whiskers. The attached ends of the whiskers are coupled to the whisker housing 81, or ring shaped member as shown in FIG. 1.

As shown in FIG. 2, an exemplary lubricating arrow rest 10 comprises a whisker insert 28 in a whisker retainer 20 and a bow fixture 60. A lubricant receiving feature 40 is shown being configured on the top of the whisker retainer. Lubricant may be dispensed to the whisker retainer through the lubricant receiving feature. A container of lubricant may be attached to the lubricant receiving feature, dispensed and then removed. A cap may be coupled to the lubricant receiving feature after filling. Lubricant may be dispensed to the plurality of whiskers 80, and subsequently to an arrow shaft (not shown).

As shown in FIG. 3, an exemplary lubricating arrow rest 10 is attached to a bow 62. A bow fixture 60 couples the whisker retainer 20 to the bow. An arrow 70 is inserted into the center region of the whiskers through the arrow insert opening 30. The large arrow indicates the direction the arrow will move when it is drawn back in preparation for shooting. As the arrow is drawn back, lubricant is transferred to the outer surface of the arrow shaft from the lubricating arrow rest 10.

As shown in FIG. 4, an exemplary lubricating arrow rest 10 is attached to a bow 62. The arrow 70 has been drawn back by the archer 16, and lubricant 12 has coated the arrow shaft 72. The lubricated arrow 76 will slide through the whiskers upon shooting and more lubricant may be coated onto the arrow shaft.

As shown in FIG. 5, an exemplary lubricating arrow rest 10 comprises a whisker retainer 20 that has a lubricant reservoir 50 attached to a lubricant receiving feature 40. The lubricating reservoir 50 comprises a container 56 that is a pliable plastic. The container 56 is attached to a reservoir adapter 34, whereby lubricant 12 can flow from the container through a supply orifice 24 and into a retainer conduit 22. The lubricant 12' within the retainer conduit is dispensed through outlet orifices, 26, 26' for example, configured around the inner perimeter 44 of the whisker retainer. The outlet orifices are in such close proximity to the whiskers that lubricant flows out of the outlet orifices and onto the whiskers. The lubricant 12" may then be wicked along the length of the whiskers to the extended ends 84 of the whiskers, or to the center opening 86. The retainer conduit 22 extends substantially around the entire perimeter of the whisker retainer 20, as shown in FIG. 5. A retainer conduit may however extend only around a portion of the whisker retainer however.

As shown in FIG. 6, the exemplary lubrication arrow rest 10 shown in FIG. 5 has the lubricant reservoir 50 deformed to dispense lubricant 12 into the retainer conduit 22. The lubricant reservoir may be a plastic container that can be squeezed to force lubricant into the whisker retainer. The whisker retainers shown in FIGS. 5 and 6 are substantially circular in shape. A portion of the circular geometry is removed to provide an arrow insert opening 30.

As shown in FIG. 7, an exemplary lubrication arrow rest 10 has a lubricant reservoir 50 attached to a reservoir adapter 34. The lubricant reservoir 50 has a bulb 55 type liquid dispensing feature 52 on the top. A user may simply press the bulb to force the lubricant 12 into the whisker retainer 20. The whiskers shown in FIG. 7 extend in a generally radial direction within whisker retainer and the extended ends form a center region 86 that has substantially no center opening. Put another way, whiskers on opposing sides of the whisker retainer have extended ends that extend substantially to each other or overlap each other.

As shown in FIG. 8, an exemplary whisker retainer 20 has a reservoir adapter 34 comprising a male threaded member 35. A lubricant reservoir or a lubricant dispensing feature may be attached to the reservoir adapter. A lubricating arrow rest, as described herein, may comprise any number of lubricant receiving features and/or reservoir adapters, and they may be configured on the whisker retainer, whisker insert and/or any other suitable portion of a lubricating arrow rest, as described herein. For example, a lubricating arrow rest may comprise a reservoir adapter and a separate lubricating dispensing feature configured around a whisker retainer. In another embodiment, a lubricating arrow rest comprises a reservoir adapter a bow fixture and a lubricant dispensing feature on a whisker retainer. Any suitable combination may be used.

As shown in FIG. 9, an exemplary lubricating arrow rest 10 has a plunger 54 lubricant dispensing feature 52. As shown, the plunger may be attached to a reservoir adapter 34 after the retainer conduit has been filled at least partially with lubricant. The whisker retainers shown in FIGS. 8 and 9 do not have an arrow insert opening. They both are circular in shape with a center opening 86 for receiving an arrow.

As shown in FIG. 10, an exemplary lubricating arrow rest 10 has a lubricant reservoir 50 coupled to a bow fixture 60. A conduit may couple the lubricant reservoir with the whisker retainer 20. The bow fixture has an adjustment feature 68 for changing the location of the center opening in relation to the bow. A box fixture may have a horizontal and vertical adjustment feature for positioning the center region of the whiskers 80 in a desired location.

As shown in FIG. 11, an exemplary lubricating arrow rest 10 has a lubricant reservoir 50 coupled to a bow fixture 60. The reservoir adapter 34 is coupled with a bow fixture conduit 64. The lubricant 12' within the bow fixture conduit flows to the supply orifice 24 and into the retainer conduit 22. The lubricant 12" within the retainer conduit flow through the outlet orifices 26 and onto the whiskers 80. The lubricant then flows or wicks along the length of the whisker to the extended ends 84 of the whiskers or the center opening 88. The lubricant 12''' in the center opening will be transferred to an arrow shaft upon insertion of the arrow. The whisker retainer 20 comprises a lubricant receiving feature 40. Note that any type and configuration of valves may be used to shut off flow of lubricant from one region to another. For example, in an alternate embodiment, a valve may be configured along the bow fixture conduit to stop flow along the conduit; whereby a lubricant dispensing feature, coupled to the whisker retainer, may be used to dispense lubricant to the whiskers and not affect flow from the lubricant reservoir 50.

As shown in FIG. 12, an exemplary lubricating arrow rest 10 is attached to a bow 62 and has a lubricant reservoir 50 coupled to a bow fixture 60. The arrow has been inserted into the whisker retainer 20 through the arrow insert opening 30. In this embodiment, the arrow shaft 72 is lubricated when the arrow is drawn back, as indicated by the large arrow.

As shown in FIG. 13, an exemplary lubricating arrow rest 10 is attached to a bow 62 and has a lubricant reservoir 50 coupled to a whisker retainer 20. The archer 16 has drawn the arrow 70 back, thereby coating the arrow shaft 72 with lubricant 12. The lubricated arrow shaft will contact the center opening again upon shooting of the arrow.

As shown in FIG. 14, an exemplary lubricating arrow rest 10 has a lubricant reservoir 50 coupled to a bow fixture 60. The whisker retainer 20 has three separate whisker portions 80, 80' and 80". The arrow insert opening 30 is configured at the top of the whisker retainer 20. Note that any suitable configuration of whiskers may be used in a whisker retainer. As shown in FIG. 14, each whisker portion may comprise a retainer conduit whereby lubricant can be delivered thereto.

As shown in FIG. 15, an exemplary lubricated arrow 76 has lubricant 12 coated along substantially the entire length La of the arrow shaft 72. The outer surface 74 of the arrow shaft 72 has lubricant 12 thereon. The arrow head 78 and fletches 77 may have little to no lubricant thereon. The fletches may receive some lubricant as they pass through the lubricating arrow rest, as described herein, upon shooting. An arrow may comprise a low friction outer surface or a transition lubricant on the outer surface. A lubricant may be configured to compliment the outer surface of the arrow shaft. For example, a lubricating arrow rest may comprise a water lubricant when an arrow is configured with a hydrogel type transition lubricant. The water may cause the hydrogel to become very slippery when the arrow is drawn back through the lubricating arrow rest.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A lubricating arrow rest configured for attachment to a bow and comprising:
   a bow fixture that detachably attaches the lubricating arrow rest to the bow and comprises:
      a position adjustment feature;
   a ring shaped whisker retainer comprising:
      a retainer conduit for receiving lubricant;
      supply orifice that extends directly to a reservoir adapter;
      plurality of outlet orifices to supply a lubricant around an inner perimeter of said whisker retainer;
      a lubricant reservoir adapter configured on a top side of the ring shaped whisker retainer;
   a lubricant dispensing feature;
   a plurality of whiskers having an extended end and an attached end that is attached to the whisker retainer;
      a detachable lubricant container attached to the lubricant reservoir adapter and extending upward from the lubricant reservoir adapter;
   wherein the position adjustment feature is configured to change the position of the whisker retainer with respect to the bow;
   wherein said plurality of whiskers extend radially within said circular geometry of whisker retainer;
   whereby a lubricant retained within said retainer conduit is configured to be dispensed through said plurality of outlet orifice to said plurality of whiskers, thereby lubricating said plurality of whiskers;
   wherein the lubricant retained within said lubricant container flows through the supply orifice and into said retainer conduit;
   wherein said lubricant within said retainer conduit is dispensed through said plurality of outlet orifices to said plurality of whiskers, thereby lubricating said plurality of whiskers;
   wherein the extended ends of the whiskers are configured to substantially surrounds an arrow shaft of an arrow when said arrow shaft is configured within the whisker retainer;
   whereby the lubricating arrow rest is configured to apply said lubricant to said arrow when said arrow is shot by the bow through the whisker retainer; and
   whereby lubricant is applied substantially around a circumference of said arrow shaft upon shooting said arrow through the lubricating arrow rest.

2. The lubricating arrow rest of claim 1, wherein the lubricant dispensing feature is configured on the lubricant container.

3. A lubricating arrow rest configured for attachment to a bow and comprising:
   a bow fixture that detachably attaches the lubricating arrow rest to the bow and comprises:
      a position adjustment feature;
   a ring shaped whisker retainer comprising:
      at least one supply orifice;
      a plurality of outlet orifices;
      a retainer conduit;
      a lubricant reservoir adapter configured on a top side of the ring shaped whisker retainer;
   a plurality of whiskers having an extended end and an attached end that is attached to the whisker retainer;
   a detachable lubricant container attached to the lubricant reservoir adapter;
   wherein the position adjustment feature is configured to change the position of the whisker retainer with respect to the bow;

wherein a lubricant retained within said lubricant container flows through the supply orifice and into said retainer conduit;

wherein said lubricant within said retainer conduit is dispensed through said plurality of outlet orifices to said plurality of whiskers, thereby lubricating said plurality of whiskers;

whereby said plurality of whiskers are configured to apply said lubricant to an arrow when said arrow is shot by the bow through the whisker retainer;

wherein the extended ends of the whiskers are configured to substantially surrounds an arrow shaft of said arrow when said arrow shaft is configured within the whisker retainer; and wherein lubricant is applied substantially around a circumference of said arrow shaft upon shooting said arrow through the lubricating arrow rest.

4. The lubricating arrow rest of claim 3, wherein the plurality of whiskers extend radially within the whisker retainer.

5. The lubricating arrow rest of claim 4, wherein the retainer conduit comprises three or more outlet orifices to supply the lubricant around an inner perimeter of the whisker retainer.

6. The lubricating arrow rest of claim 5, wherein the retainer conduit extends substantially along the perimeter of the whisker retainer.

7. The lubricating arrow rest of claim 3, wherein the whisker retainer comprises an arrow insert opening.

8. The lubricating arrow rest of claim 3, wherein the plurality of whiskers extend to a center region having substantially no center opening.

9. The lubricating arrow rest of claim 3, wherein the lubricant reservoir adapter comprises a threaded member.

10. The lubricating arrow rest of claim 3, wherein the detachable lubricant container extends upward from the lubricant reservoir adapter.

11. The lubricating arrow rest of claim 3, further comprising a lubrication dispensing feature.

12. The lubricating arrow rest of claim 11, wherein the lubrication dispensing feature is detachably attachable.

13. A method of lubricating an arrow shaft, comprising the steps of:

providing a lubricating arrow rest configured for attachment to a bow and comprising:
  a bow fixture that detachably attaches the lubricating arrow rest to the bow and comprises:
    a position adjustment feature;
  a ring shaped whisker retainer comprising:
    at least one supply orifice;
    a plurality of outlet orifices;
    a retainer conduit;
    a lubricant reservoir adapter configured on a top side of the ring shaped whisker retainer;
  a plurality of whiskers having an extended end and an attached end that is attached to the whisker retainer;
  a detachable lubricant container attached to the lubricant reservoir adapter;

providing a lubricant to said whisker retainer through said lubricant receiving feature;

whereby said lubricant is dispensed through said plurality of outlet orifices to said plurality of whiskers, thereby providing lubricated whiskers;

configuring an arrow, having an arrow shaft, in said whisker retainer, whereby said arrow shaft is in contact with said lubricated whiskers; wherein the extended ends of the whiskers are configured to substantially surrounds the arrow shaft of the arrow when said arrow shaft is configured within the whisker retainer;

pulling said arrow through said whiskers to coat an outer surface of said arrow shaft with said lubricant, thereby producing an arrow having a lubricated arrow shaft; and wherein lubricant is applied substantially around a circumference of said arrow shaft upon shooting said arrow through the lubricating arrow rest.

14. The method of lubricating an arrow shaft of claim 13, wherein the lubricating arrow rest further comprises:
  a lubricant dispensing device.

\* \* \* \* \*